(12) United States Patent
Chang

(10) Patent No.: US 9,350,518 B2
(45) Date of Patent: May 24, 2016

(54) DYNAMIC BANDWIDTH ALLOCATION IN OFDM COMMUNICATION SYSTEMS

(71) Applicant: Metanoia Communications Inc., Hsinchu (TW)

(72) Inventor: Chun-Che Chang, Hsinchu (TW)

(73) Assignee: Metanoia Communications Inc., Taiwan (CN)

( * ) Notice: Subject to any disclaimer, the term of this patent is extended or adjusted under 35 U.S.C. 154(b) by 130 days.

(21) Appl. No.: 14/196,739

(22) Filed: Mar. 4, 2014

(65) Prior Publication Data
US 2014/0269957 A1   Sep. 18, 2014

Related U.S. Application Data

(60) Provisional application No. 61/778,232, filed on Mar. 12, 2013.

(51) Int. Cl.
*H04L 1/00*   (2006.01)
*H04L 5/00*   (2006.01)
*H04L 27/26*   (2006.01)

(52) U.S. Cl.
CPC .......... *H04L 5/0064* (2013.01); *H04L 27/2601* (2013.01)

(58) Field of Classification Search
CPC ........... H04W 4/08; H04W 4/16; H04W 4/18; H04W 28/02; H04W 28/0205; H04W 28/0215; H04W 4/0236
USPC ......... 370/310, 312, 230, 229, 235, 329, 330, 370/338, 34
See application file for complete search history.

(56) References Cited

U.S. PATENT DOCUMENTS

| 7,869,360 B2 * | 1/2011 | Shi ........................ H04L 1/0002 370/231 |
| 8,848,628 B2 * | 9/2014 | Ko ...................... H04J 11/0053 370/328 |
| 2002/0131363 A1 * | 9/2002 | Beshai ................ H04L 12/5695 370/230 |

* cited by examiner

*Primary Examiner* — Dady Chery
(74) *Attorney, Agent, or Firm* — Han IP Corporation; Andy M. Han

(57) ABSTRACT

Various embodiments of a mechanism of dynamic allocation of bandplan are provided. In one aspect, a communication device utilizes a bandplan during initialization in a digital communication system. The communication device modifies the bandplan after one or more channel estimations to optimize data rates of communications in a downstream direction and an upstream direction.

35 Claims, 5 Drawing Sheets

300

```
┌─────────────────────────────────────────────────────────┐
│ DETERMINE WHETHER TO ENTER INTO SHOWTIME OR TO RE-INITIALIZE │
│                WITH A MODIFIED BANDPLAN                 │
│                          302                            │
└─────────────────────────────────────────────────────────┘
                            │
                            ▼
┌─────────────────────────────────────────────────────────┐
│ IN RESPONSE TO DETERMINING TO RE-INITIALIZE WITH A MODIFIED │
│ BANDPLAN, REPORT A REASON FOR RE-INITIALIZATION IN O-PMD, OR │
│ ONE OR MORE OTHER VTU-O GENERAL MESSAGES, AND RE-INITIALIZE │
│         WITH A DYNAMICALLY ADJUSTED BANDPLAN            │
│                          304                            │
└─────────────────────────────────────────────────────────┘
```

FIG. 3

DYNAMIC BANDWIDTH ALLOCATION IN OFDM COMMUNICATION SYSTEMS

CROSS REFERENCE TO RELATED PATENT APPLICATION

This is a non-provisional application of U.S. Patent Application No. 61/778,232, entitled "Dynamic Bandwidth Allocation in OFDM Communication Systems" and filed on 12 Mar. 2013, which is herein incorporated by reference.

TECHNICAL FIELD

The present disclosure relates to the field of digital communications and, more specifically, to dynamic allocation of bandwidth in orthogonal frequency-division multiplexing (OFDM) communication systems.

BACKGROUND

In OFDM communications, such as communications based on the Very-high-bit-rate Digital Subscriber Line 2 (VDSL2) technology as defined in the ITU-T G.993.2 standard, the concept of bandplan is adopted. A bandplan is a plan for using a particular band of radio frequencies of a portion of the electromagnetic spectrum. A bandplan defines the operation frequency range and contains several groups of consecutive sub-carriers designated either to the upstream direction or the downstream direction. For point-to-point fiber-to-the-distribution-point (Fttdp) applications where crosstalk management across loops is not required, the bandplan is typically not required to be fixed. In these applications, guaranteeing a certain service rate and/or maintaining a desired upstream/downstream ratio tend to be of the highest priority. For example, a service provider may plan to provide a 200 Mbps downstream and 50 Mbps upstream rates at 100 meters to its customers. Although the aggregated data rate with the VDSL2 30a technology should be sufficient, it is not guaranteed that all subscribers will get 200 Mbps/50 Mbps rates with a fixed-bandplan approach due to variations in loop length, in-house wiring, etc.

To mitigate this problem, there is a need for a mechanism that allows a VDSL2 transceiver unit at the central office unit (VTU-O) to dynamically change bandplan based on the result of channel estimation.

SUMMARY

Various embodiments pertaining to techniques, processes, algorithms and devices related to a mechanism for dynamic allocation of bandwidth in OFDM communications are described herein. The techniques or algorithms may be implemented in software, firmware, middleware, hardware, or any combination thereof.

In one aspect, a method may comprise: utilizing, by a communication device, a bandplan during initialization in a digital communication system; performing, by the communication device, one or more channel estimations; and modifying, by the communication device, the bandplan after performing the one or more channel estimations to optimize data rates of communications in a downstream direction and an upstream direction.

In one embodiment, the digital communication system may comprise an OFDM system.

In one embodiment, the OFDM system may comprise an OFDM system in accordance with the ITU-T G.993.2 standard.

In one embodiment, the bandplan may comprise grouping of a plurality of sub-carriers into a plurality of groups of sub-carriers and allocation of each group of sub-carriers to either the upstream direction or the downstream direction, respectively.

In one embodiment, the initialization may comprise the communication device executing one or more protocols or processes to learn channel capacity from the one or more channel estimations and derive bit loading to meet the channel capacity with one or more constraints.

In one embodiment, the one or more protocols or processes may comprise an initialization protocol followed by the communication device entering a showtime state in which user data are transmitted.

In one embodiment, the performing the one or more channel estimations comprises performing signal-to-noise ratio (SNR) calculation for each sub-carrier.

In one embodiment, the communication device may comprise a Very-high-bit-rate Digital Subscriber Line 2 (VDSL2) transceiver unit at a central office unit (VTU-O) or a VDSL2 transceiver unit at a remote terminal (VTU-R).

In one embodiment, the modifying the bandplan may comprise determining, by the communication device, whether to enter into showtime or to re-initialize with a modified bandplan.

In one embodiment, in response to determining to re-initialize with a modified bandplan, the communication device may report a reason for re-initialization in O-PMD, or one or more other VTU-O generated messages, and re-initialize with a dynamically adjusted bandplan.

In one embodiment, the method may further comprise re-initializing, by the communication device, one or more times to aid optimization of bandwidth partitioning.

In one embodiment, the modifying the bandplan may comprise: determining, by the communication device, data rate in the upstream direction; and re-partitioning a band. The re-partitioning may comprise zero-bit-loading, by the communication device, one or more upstream tones that will be allocated to the downstream direction.

In one embodiment, the zero-bit-loading one or more upstream tones may comprise assigning, by the communication device, one or more zero information bits to each of the one or more upstream tones by a first series of seamless-rate-adaptation (SRA) commands.

In one embodiment, the re-partitioning the band may further comprise issuing, by the communication device, a bandplan re-partitioning online reconfiguration (OLR) command.

In one embodiment, the method may further comprise gradually loading one or more information bits, by the second communication device, onto one or more newly joined downstream tones.

In one embodiment, the gradually loading one or more information bits onto one or more newly joined downstream tones may comprise gradually loading one or more information bits, by the second communication device, onto the one or more newly joined downstream tones by a second series of SRA commands.

In one embodiment, the modifying the bandplan may comprise requesting, by the communication device, a first number of sub-carriers to be re-allocated to the upstream direction.

In one embodiment, the requesting may comprise sending an OLR command to a second communication device.

In one embodiment, the modifying the bandplan may further comprise receiving an indication from a second communication device that the second communication device is ready for bandplan re-partitioning.

In one embodiment, the receiving the indication may comprise receiving the indication from the second communication device after the second communication device assigns one or more zero information bits to each of one or more tones that will be allocated to the upstream direction by a series of SRA commands.

In one embodiment, the modifying the bandplan may further comprise issuing a bandplan re-partitioning OLR command.

In another aspect, a device for OFDM data communications may comprise a memory unit, a communication unit, and a processing unit. The memory unit may be configured to store one or more sets of instructions therein. The communication unit may be configured to receive and transmit data. The processing unit may be coupled to the memory unit and the communication unit, and configured to access the one or more sets of instructions and to control operations of the communication unit. The processing unit may be configured to execute the one or more sets of instructions to perform operations comprising: utilizing a bandplan during initialization in a digital communication system; and modifying the bandplan after one or more channel estimations to optimize data rates of communications in a downstream direction and an upstream direction.

In one embodiment, in modifying the bandplan, the processing unit may be configured to perform operations comprising determining whether to enter into showtime or to re-initialize with a modified bandplan.

In one embodiment, the processing unit may be further configured to perform operations comprising, in response to determining to re-initialize with a modified bandplan, reporting a reason for re-initialization in O-PMD, or one or more other VTU-O generated messages, and re-initializing with a dynamically adjusted bandplan.

In one embodiment, the processing unit may be further configured to perform operations comprising re-initializing one or more times to aid optimization of bandwidth partitioning.

In one embodiment, in modifying the bandplan the processing unit may be configured to perform operations comprising: determining whether to enter into showtime or to re-initialize with a modified bandplan; determining data rate in the upstream direction; and re-partitioning a band. The re-partitioning may comprise zero-bit-loading one or more upstream tones that will be allocated to the downstream direction.

In one embodiment, the zero-bit-loading one or more upstream tones may comprise assigning one or more zero information bits to each of the one or more upstream tones by a series of SRA commands.

This summary is provided to introduce concepts relating to techniques related to the proposed dynamic allocation of bandwidth in OFDM communications. Some embodiments of the techniques are further described below in the detailed description. This summary is not intended to identify essential features of the claimed subject matter, nor is it intended for use in determining the scope of the claimed subject matter.

BRIEF DESCRIPTION OF THE DRAWINGS

The accompanying drawings are included to provide a further understanding of the disclosure, and are incorporated in and constitute a part of the present disclosure. The drawings illustrate embodiments of the disclosure and, together with the description, serve to explain the principles of the disclosure.

It is appreciable that the drawings are not necessarily in scale as some components may be shown to be out of proportion than the size in actual implementation in order to clearly illustrate the concept of the present disclosure.

FIG. 3 is a flowchart of another aspect of dynamic allocation of bandplan in accordance with an embodiment of the present disclosure.

DETAILED DESCRIPTION OF PREFERRED EMBODIMENTS

Overview

Various embodiments of two approaches described in the present disclosure pertain to a mechanism for dynamic allocation of bandwidth in OFDM communications. The approaches keep changes to the ITU-T G.993.2 to a minimum.

To keep the proposed mechanism simple yet flexible, a bandplan with one or more fixed downstream/upstream portion(s) and a band with a flexible demarcation point between upstream and downstream are suggested. This demarcation point is set after a single or multiple channel estimation(s) is/are made. The fixed portion(s) of downstream/upstream gives a basic link rate and holds pilots, the embedded overhead channel (EOC), the robust overhead channel (ROC) and the retransmission return channel (RRC) if G.998.4 is enabled. The flexible portion(s) can be optimized depending on the requirements of the service providers.

Figure 1:
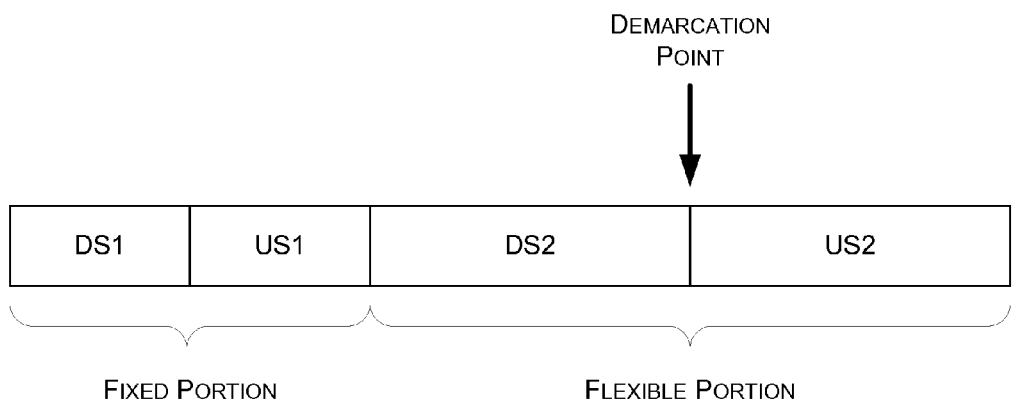
FIG. 1 is a diagram of a bandplan in accordance with an embodiment of the present disclosure.

FIG. 1 illustrates a bandplan in accordance with an embodiment of the present disclosure. As shown in FIG. 1, the bandplan includes a fixed portion and a flexible portion. In the example shown, the fixed portion includes one downstream band (DS1) and one upstream band (US1).

A first approach involves dynamic bandplan partitioning using plural initializations. This approach is straightforward and entails a number of stages as described below. During initialization, both VTU-O and VTU-R use a predefined bandplan and follow the initialization protocol all the way to the last stage before showtime (e.g., O-PMD). Showtime refers to a state in which the communication devices are carrying user data (e.g., packets) as opposed to training time where initialization procedure is carried out. O-PMD is a message specific to the VDSL2 standard. In non-VDSL2 implementations, the initialization protocol may be followed all the way to a last stage, which is not O-PMD, before showtime. Based on the available data rate, the VTU-O decides whether or not to enter into showtime or re-initialize with a modified bandplan. If the VTU-O decides to re-initialize with a modified bandplan, the VTU-O may report the reason for re-initialization in the initialization status (e.g., field number 5) in O-PMD, a message originated from the central office (e.g., VTU-O) during initialization (training) where PMD stands for physical media dependent, and re-initialize with a dynamically adjusted bandplan in both G.hs and O-SIGNATURE, which is the first message originated from VTU-O during VDSL2 initialization. Alternatively, the VTU-O may perform re-initialization without reporting.

Multiple re-initializations may be necessary in some extreme cases to ensure the optimum bandwidth partitioning is achieved.

A second approach involves partitioning using online reconfiguration (OLR) commands. Special OLR commands are defined to facilitate the re-allocation of a given bandplan. Once in showtime, the VTU-O investigates its upstream/downstream rates and initiates a bandplan re-partition of a flexible portion of the bandplan using a new OLR method. If the VTU-O desires to expand the downstream band, the operations involved can be approximately separated into three stages. Firstly, the VTU-O sets one or more of the information bits assigned to each of those upstream tones that will be allocated to the downstream direction to zero by a series of seamless-rate-adaption (SRA) commands, The setting of one or more of the information bits assigned to a tone to zero for a given tone removes the tone from the receiving frequency band, and is inter-changeably referred to as "assigning one or more zero information bits to each of one or more tones", "offsetting one or more information bits assigned to each of one or more tones to zero", "zero-bit-loading" or a variation thereof in the present disclosure. Secondly, the VTU-O issues a bandplan re-partitioning OLR command. Thirdly, after the re-partition, the VTU-R gradually loads onto those newly joined downstream tones with one or more information bits by a series of SRA commands.

On the other hand, if the VTU-O desires to expand the number of sub-carriers in the upstream band, the operations involved can be approximately separated into four stages. Firstly, the VTU-O requests a certain number of sub-carriers to be re-allocated to the upstream direction by sending the VTU-R a special OLR command. Secondly, the VTU-R zero-bit-loads those tones that will be allocated to the upstream direction by a series of SRA commands. Thirdly, the VTU-R signals the VTU-O that it is ready for a bandplan re-partition by sending the VTU-O a special OLR command. Lastly, the VTU-O issues a bandplan re-partitioning OLR command.

Irrespective of which approach is implemented, the main concept of the present disclosure is that the VTU-O changes the bandplan based on the result of one or more channel estimation(s). It is noteworthy that actual implementations of the approach with OLR commands might not be as simple as described above. Beside the complexity required in the steps above it might also require a new OLR command to handle the tone-ordering table.

Example Processes

Figure 2:
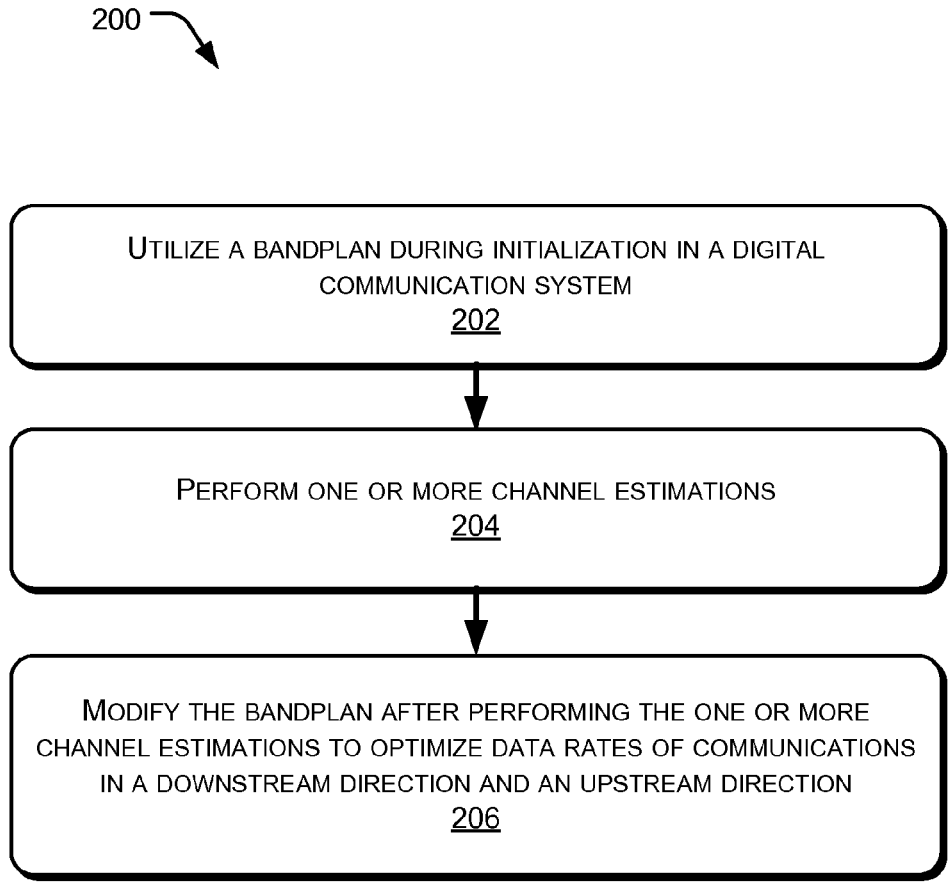
FIG. 2 is a flowchart of one aspect of dynamic allocation of bandplan in accordance with an embodiment of the present disclosure.

FIG. 2 illustrates a process 200 of one aspect of dynamic allocation of bandplan in accordance with an embodiment of the present disclosure.

Example process 200 includes one or more operations, actions, or functions as illustrated by one or more of blocks 202 and 204. Although illustrated as discrete blocks, various blocks may be divided into additional blocks, combined into fewer blocks, or eliminated, depending on the desired implementation. Further, process 200 may be implemented by software, firmware, middleware, hardware, or a combination thereof in a communication device. For illustrative purposes, the operations described below are performed by a processor or integrated circuit of a communication device, such as communication device 500 as described below. Processing may begin at block 202.

At 202, a communication device may utilize a bandplan during initialization in a digital communication system.

At 204, the communication device may perform one or more channel estimations.

At 206, the communication device may modify the bandplan after performing the one or more channel estimations to optimize data rates of communications in a downstream direction and an upstream direction.

In one embodiment, the digital communication system may comprise an OFDM system.

In one embodiment, the OFDM system may comprise an OFDM system in accordance with the ITU-T G.993.2 standard.

In one embodiment, the bandplan may comprise grouping of a plurality of sub-carriers into a plurality of groups of sub-carriers and allocation of each group of sub-carriers to either the upstream direction or the downstream direction, respectively.

In one embodiment, the initialization may comprise the communication device executing one or more protocols or processes to learn channel capacity from the one or more channel estimations and derive bit loading to meet the channel capacity with one or more constraints.

In one embodiment, the one or more protocols or processes may comprise an initialization protocol followed by the communication device entering a showtime state in which user data are transmitted.

In one embodiment, the performing the one or more channel estimations comprises performing signal-to-noise ratio (SNR) calculation for each sub-carrier.

In one embodiment, the communication device may comprise a VTU-O or a VTU-R.

In one embodiment, the modifying the bandplan may comprise determining, by the communication device, whether to enter into showtime or to re-initialize with a modified bandplan.

In one embodiment, in response to determining to re-initialize with a modified bandplan, the communication device may report a reason for re-initialization in O-PMD, or one or more other VTU-O generated messages, and re-initialize with a dynamically adjusted bandplan.

In one embodiment, process 200 may further comprise re-initializing, by the communication device, one or more times to aid optimization of bandwidth partitioning.

In one embodiment, the modifying the bandplan may comprise: determining, by the communication device, data rate in the upstream direction; and re-partitioning a band. The re-partitioning may comprise zero-bit-loading, by the communication device, onto one or more upstream tones that will be allocated to the downstream direction.

In one embodiment, the zero-bit-loading one or more upstream tones may comprise setting, by the communication device, assigning one or more zero information bits to each of the one or more upstream tones by a first series of SRA commands.

In one embodiment, the re-partitioning the band may further comprise issuing, by a second communication device, a bandplan re-partitioning OLR command.

In one embodiment, process 200 may further comprise gradually loading one or more information bits, by the second communication device, onto one or more newly joined downstream tones.

In one embodiment, the gradually loading one or more information bits onto one or more newly joined downstream tones may comprise gradually loading the one or more information bits, by the second communication device, onto the one or more newly joined downstream tones by a second series of SRA commands.

In one embodiment, the modifying the bandplan may comprise requesting, by the communication device, a first number of sub-carriers to be re-allocated to the upstream direction.

In one embodiment, the requesting may comprise sending an OLR command to a second communication device.

In one embodiment, the modifying the bandplan may further comprise receiving an indication from a second communication device that the second communication device is ready for bandplan re-partitioning.

In one embodiment, the receiving the indication may comprise receiving the indication from the second communication device after the second communication device assigns one or more zero information bits to each of one or more tones that will be allocated to the upstream direction by a series of SRA commands.

In one embodiment, the modifying the bandplan may further comprise issuing a bandplan re-partitioning OLR command.

FIG. 3 illustrates a process 300 of another aspect of dynamic allocation of bandplan in accordance with an embodiment of the present disclosure.

Example process 300 includes one or more operations, actions, or functions as illustrated by one or more of blocks 302 and 304. Although illustrated as discrete blocks, various blocks may be divided into additional blocks, combined into fewer blocks, or eliminated, depending on the desired implementation. Further, process 300 may be implemented by software, hardware, or a combination of software and hardware in a communication device. For illustrative purposes, the operations described below are performed by a processor or integrated circuit of a communication device, such as communication device 500 as described below. Processing may begin at block 302.

At 302, the communication device may determine whether to enter into showtime or to re-initialize with a modified bandplan.

At 304, in response to determining to re-initialize with a modified bandplan, the communication device reports a reason for re-initialization in O-PMD, or one or more other VTU-O generated messages, and re-initializes with a dynamically adjusted bandplan.

In one embodiment, process 300 may further comprise the communication device re-initializing one or more times to aid optimization of bandwidth partitioning.

Figure 4:
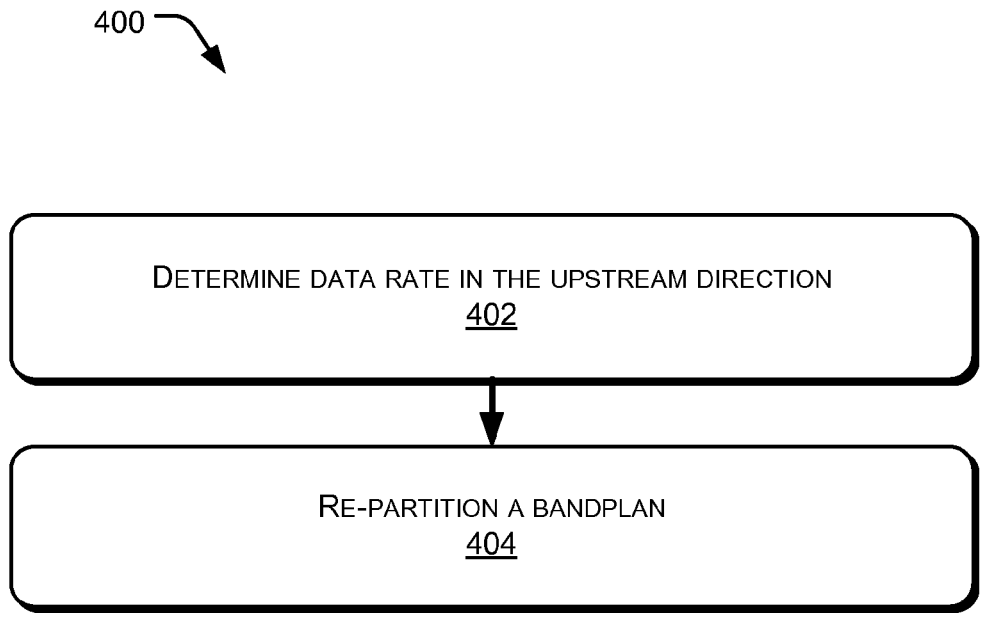
FIG. 4 is a flowchart of yet another aspect of dynamic allocation of bandplan in accordance with an embodiment of the present disclosure.

FIG. 4 illustrates a process 400 of another aspect of dynamic allocation of bandplan in accordance with an embodiment of the present disclosure.

Example process 400 includes one or more operations, actions, or functions as illustrated by one or more of blocks 402 and 404. Although illustrated as discrete blocks, various blocks may be divided into additional blocks, combined into fewer blocks, or eliminated, depending on the desired implementation. Further, process 400 may be implemented by software, hardware, or a combination of software and hardware in a communication device. For illustrative purposes, the operations described below are performed by a processor or integrated circuit of a communication device, such as communication device 500 as described below. Processing may begin at block 402.

At 402, the communication device may determine data rate in an upstream direction.

At 404, the communication device may re-partition a bandplan.

In one embodiment, the re-partitioning may comprise zero-bit-loading, by the communication device, one or more upstream tones that will be allocated to the downstream direction.

In one embodiment, the zero-bit-loading one or more upstream tones may comprise assigning, by the communication device, one or more zero information bits to each the one or more upstream tones by a first series of SRA commands.

In one embodiment, the re-partitioning the band may further comprise a second communication device issuing a bandplan re-partitioning OLR command.

In one embodiment, process 400 may further comprise the second device gradually loading one or more information bits onto one or more newly joined downstream tones.

In one embodiment, the gradually loading one or more information bits onto one or more newly joined downstream tones may comprise gradually loading the one or more information bits, by the second communication device, onto the one or more newly joined downstream tones by a second series of SRA commands.

Example Communication Device

Figure 5:
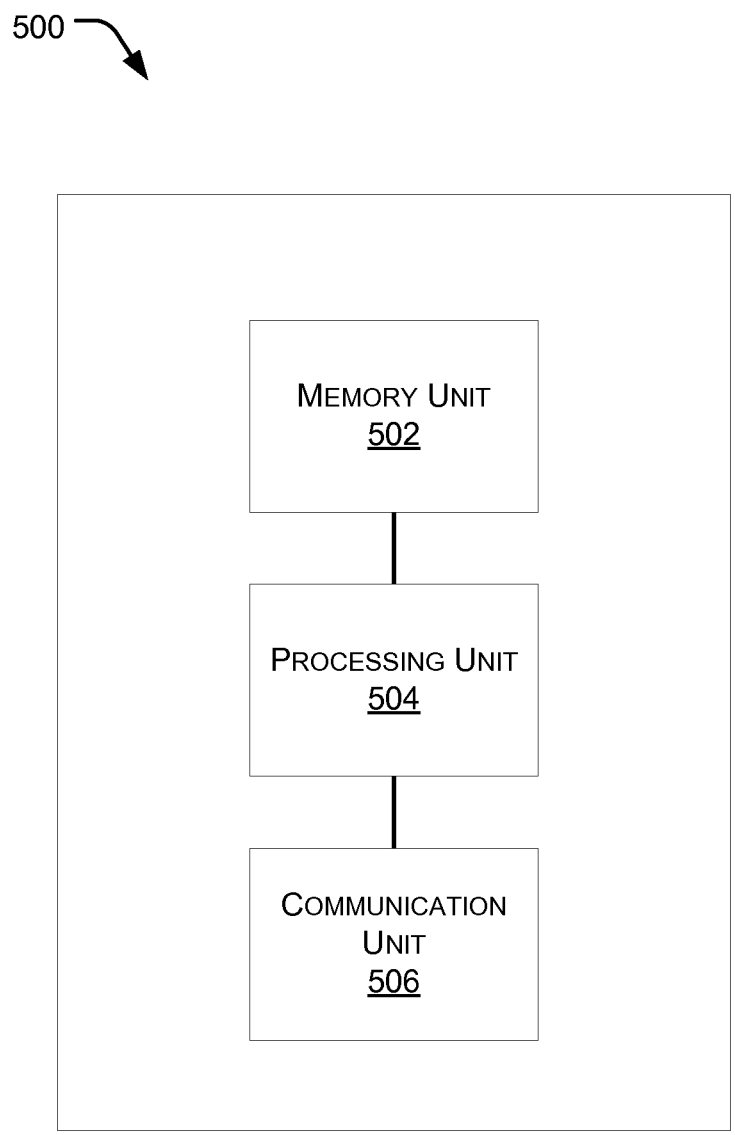
FIG. 5 is a block diagram of a communication device in accordance with an embodiment of the present disclosure.

FIG. 5 illustrates components of a communication device 500 that is capable of performing operations in accordance with the present disclosure, including executing either or both of process 200, process 300, process 400 and/or any variation thereof. Communication device 500 may be an integrated-circuit processor, a chipset, or an apparatus incorporating such processor or chipset, for example.

As shown in FIG. 5, the communication device 500 comprises a memory unit 502, a processing unit 504, and a communication unit 506. The memory unit 502 is configured to store one or more sets of instructions therein. The processing unit 504 is configured to execute the one or more sets of instructions stored in the memory unit 502. The communication unit 506 is configured to transmit data (e.g., packets) and receive data under the command of the processing unit 504. Upon executing the one or more sets of instructions stored in the memory unit 502, the processing unit 504 carries out executing either or both of process 200, process 300, process 400 and/or any variation thereof.

For example, device 500 may be a communication device for OFDM data communications. Device 500 may comprise the memory unit 502, the communication unit 506, and the processing unit 504. The memory unit 502 is configured to store one or more sets of instructions therein. The communication unit 506 is configured to receive and transmit data. The processing unit 504 is coupled to the memory unit 502 and the communication unit 506, and is configured to access the one or more sets of instructions and to control operations of the communication unit. The processing unit 504 may be configured to execute the one or more sets of instructions to utilize a bandplan during initialization in a digital communication system, and to modify the bandplan after performing one or more channel estimations to optimize data rates of communications in a downstream direction and an upstream direction.

In one embodiment, in modifying the bandplan, the processing unit 504 may be configured to determine whether to enter into showtime or to re-initialize with a modified bandplan. In response to determining to re-initialize with a modified bandplan, the processing unit 504 may report a reason for re-initialization in O-PMD, or one or more other VTU-O generated messages, and re-initialize with a dynamically adjusted bandplan.

In one embodiment, the processing unit 504 may be further configured to perform operations comprising re-initializing one or more times to aid optimization of bandwidth partitioning.

In one embodiment, in modifying the bandplan the processing unit 504 may be configured to perform operations comprising: determining whether to enter into showtime or to re-initialize with a modified bandplan; determining data rate in the upstream direction; and re-partitioning a band. The re-partitioning may comprise zero-bit-loading one or more upstream tones that will be allocated to the downstream direction.

In one embodiment, the zero-bit-loading one or more upstream tones may comprise offsetting one or more information bits assigned to each of the one or more upstream tones to zero by a series of SRA commands.

Additional and Alternative Implementation Notes

Although the techniques have been described in language specific to structural features and/or methodological acts, it is to be understood that the appended claims are not necessarily limited to the specific features or acts described. Rather, the specific features and acts are disclosed as example forms of implementing such techniques. Those skilled in the art may make derivations and/or modifications of any of the disclosed embodiments or any variations thereof, and such derivations and modifications are still within the scope of the present disclosure.

In the above description of example implementations, for purposes of explanation, specific numbers, materials configurations, and other details are set forth in order to better explain the invention, as claimed. However, it will be apparent to one skilled in the art that the claimed invention may be practiced using different details than the example ones described herein. In other instances, well-known features are omitted or simplified to clarify the description of the example implementations.

The inventor intends the described embodiments to be primarily examples. The inventor does not intend these embodiments to limit the scope of the appended claims. Rather, the inventor has contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, systems, methods, articles of manufacture, and/or computer-readable instructions as indicated by the context described herein.

As used in the present disclosure, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A method, comprising:
performing, by a first communication device in an orthogonal frequency-division multiplexing (OFDM) communication system with the first communication device and a second communication device, one or more channel estimations, either on its own or using the second communication device; and
modifying, by the first communication device, a predefined bandplan after performing the one or more channel estimations in either a downstream direction or in an upstream direction or both in the downstream direction and in the upstream direction,
wherein each communication device transmits either in the downstream direction or in the upstream direction, and
wherein initially both the first communication device and the second communication device transmit using the predefined bandplan which determines a set of subcarriers used for transmissions in the upstream direction and a set of subcarriers used for transmissions in the downstream direction.

2. The method of claim 1, wherein the OFDM communication system comprises an OFDM system in accordance with the ITU-T G.993.2 standard.

3. The method of claim 2, wherein the first communication device comprises a Very-high-bit-rate Digital Subscriber Line 2(VDSL2) central-office (VTU-O) transceiver unit and the second communication device comprises a VDSL2 transceiver unit at a remote terminal (VTU-R) or vice versa.

4. The method of claim 3, wherein the re-partitioning comprises zero-bit-loading, by either or both of the first communication device and the second communication device, one or more upstream subcarriers that will be allocated to the downstream direction, and wherein the zero-bit-loading one or more upstream subcarriers comprises assigning, by either or both of the first communication device and the second communication device, zero information bits to each of the one or more upstream subcarriers by a first series of SRA commands as defined in G.993.2.

5. The method of claim 3, wherein the re-partitioning the band further comprises:
requesting, by a second communication device, a bandplan re-partitioning online reconfiguration (OLR) command as defined or to be defined in G.993.2.

6. The method of claim 3, wherein the requesting comprises sending an online reconfiguration (OLR) command to a second communication device as defined or to be defined in G.993.2.

7. The method of claim 3, wherein the receiving the indication comprises receiving the indication from either or both of the first communication device and the second communication device after the respective communication device assigns zero information bits to each of one or more subcarriers that will be allocated to the upstream direction by a series of seamless-rate-adaptation (SRA) commands as defined in G.993.2.

8. The method of claim 3, wherein the modifying the bandplan further comprises:
issuing a bandplan re-partitioning online reconfiguration (OLR) command as defined or to be defined in G.993.2.

9. The method of claim 1, wherein the bandplan comprises grouping of a plurality of sub-carriers into a plurality of groups of sub-carriers and allocation of each group of sub-carriers to either the upstream direction or the downstream direction, respectively.

10. The method of claim 1, further comprising either or both of the first communication device and the second communication device executing one or more protocols or processes to learn channel capacity from the one or more channel estimations and derive bit loading to meet the channel capacity with one or more constraints.

11. The method of claim 10, wherein the one or more protocols or processes comprise an initialization protocol followed by either or both of the first communication device and the second communication device entering a showtime state in which user data are transmitted.

12. The method of claim 1, wherein the performing the one or more channel estimations comprises performing signal-to-noise ratio (SNR) calculation for each sub-carrier.

13. The method of claim 1, wherein the modifying the bandplan comprises determining, by either or both of the first communication device and the second communication device, whether to enter into showtime state in which user data are transmitted or to re-initialize with a modified bandplan.

14. The method of claim 13, wherein, in response to determining to re-initialize with a modified bandplan, either the first communication device or the second communication device reports a reason for re-initialization in the operator-physical medium dependent (O-PMD) message, or one or more other Very-high-bit-rate Digital Subscriber Line 2(VDSL2) central-office (VTU-O) transceiver unit generated messages as defined or to be defined in G.993.2, and re-initializes with a dynamically adjusted bandplan.

15. The method of claim 13, further comprising:
re-initializing, by either or both of the first communication device and the second communication device, one or more times to aid optimization of bandwidth partitioning.

16. The method of claim 1, wherein the modifying the bandplan comprises:
determining, by either or both of the first communication device and the second communication device, data rate in the upstream direction; and
re-partitioning a frequency band to generate a new bandplan,
wherein the re-partitioning comprises zero-bit-loading, by either or both of the first communication device and the second communication device, one or more upstream subcarriers that will be allocated to the downstream direction.

17. The method of claim 16, wherein the re-partitioning comprises zero-bit-loading, by either or both of the first communication device and the second communication device, one or more upstream subcarriers that will be allocated to the downstream direction, and wherein the zero-bit-loading one or more upstream subcarriers comprises assigning, by either or both of the first communication device and the second communication device, zero information bits to each of the one or more upstream subcarriers by a first series of SRA commands as defined in G.993.2.

18. The method of claim 17, further comprising:
gradually loading one or more information bits, by either or both of the first communication device and the second communication device, onto one or more newly allocated downstream subcarriers.

19. The method of claim 18, wherein the gradually loading information bit(s) onto one or more newly allocated downstream subcarriers comprises gradually loading information bit(s), by either or both of the first communication device and the second communication device, onto the one or more newly allocated downstream subcarriers by a second series of seamless-rate-adaptation (SRA) commands as defined in G.993.2.

20. The method of claim 16, wherein the re-partitioning the band further comprises:
requestinq, by either or both of the first communication device and the second communication device, a bandplan re-partitioning-online reconfiguration (OLR) command as defined or to be defined in G.993.2.

21. The method of claim 1, wherein the modifying the bandplan comprises:
requesting, by either the first communication device or the second communication device, a first number of subcarriers to be re-allocated to the upstream direction.

22. The method of claim 21, wherein the requesting comprises sending an online reconfiguration (OLR) command to a second communication device as defined or to be defined in G.993.2.

23. The method of claim 21, wherein the modifying the bandplan further comprises:
the requesting communication device receiving an indication from the requested communication device that the requested communication device is ready for bandplan re-partitioning.

24. The method of claim 23, wherein the receiving the indication comprises receiving the indication from the requested communication device after the requested communication device assigns zero information bits to each of one or more subcarriers that will be allocated to the upstream direction by a series of seamless-rate-adaptation (SRA) commands as defined in G.993.2.

25. The method of claim 23, wherein the modifying the bandplan further comprises:
issuing a bandplan re-partitioning online reconfiguration (OLR) command as defined or to be defined in G.993.2.

26. A device for orthogonal frequency-division multiplexing (OFDM) data communications, comprising:
a memory unit configured to store one or more sets of instructions therein;
a communication unit configured to receive and transmit data; and
a processing unit coupled to the memory unit and the communication unit, the processing unit configured to access the one or more sets of instructions and to control operations of the communication unit, the processing unit configured to execute the one or more sets of instructions to perform operations comprising:
performing one or more channel estimations in an OFDM communication system with the device and an another communication device, either on its own or using the another communication device; and
modifying a predefined bandplan after performing the one or more channel estimations in either a downstream direction or in an upstream direction or both in the downstream direction and in the upstream direction,
wherein the device transmits either in the downstream direction or in the upstream direction, and
wherein initially both the device and the another communication device transmit using the predefined bandplan which determines a set of subcarriers used for transmissions in the upstream direction and a set of subcarriers used for transmissions in the downstream direction.

27. The device of claim 26, wherein in modifying the bandplan, the processing unit is configured to perform operations comprising:
determining whether to enter into showtime state in which user data are transmitted or to re-initialize with a modified bandplan.

28. The device of claim 27, wherein the processing unit is further configured to perform operations comprising:
re-initializing one or more times to aid optimization of bandwidth partitioning.

29. The device of claim 27, wherein the processing unit is further configured to perform operations comprising:
in response to determining to re-initialize with a modified bandplan, reporting a reason for re-initialization in operator-physical medium dependent (O-PMD), or one or more other Very-high-bit-rate Digital Subscriber Line 2(VDSL2) central-office (VTU-O) transceiver units generated messages, and re-initializing with a dynamically adjusted bandplan.

30. The device of claim 26, wherein in modifying the bandplan the processing unit is configured to perform operations comprising:
- determining whether to enter into showtime in which user data are transmitted or to re-initialize with a modified bandplan;
- determining data rate in the upstream direction; and
- re-partitioning a band,
- wherein the re-partitioning comprises zero-bit-loading one or more upstream subcarriers that will be allocated to the downstream direction.

31. The device of claim 30, wherein the zero-bit-loading one or more upstream subcarriers comprises assigning zero information bits to each of the one or more upstream subcarriers.

32. The device of claim 26, wherein the performing and the modifying comply with the ITU-T G.993.2 standards with the device and the another communication device being either a Very-high-bit-rate Digital Subscriber Line 2(VDSL2) central-office (VTU-O) transceiver unit or a VDSL2 transceiver unit at a remote terminal (VTU-R) according to G.993.2 standard.

33. The device of claim 32, wherein in modifying the bandplan, the processing unit is configured to perform operations comprising:
- determining whether to enter into showtime or to re-initialize with a modified bandplan.

34. The device of claim 32, wherein in modifying the bandplan the processing unit is configured to perform operations comprising:
- determining whether to enter into showtime or to re-initialize with a modified bandplan;
- determining data rate in the upstream direction; and
- re-partitioning a band,
- wherein the re-partitioning comprises zero-bit-loading one or more upstream subcarriers that will be allocated to the downstream direction.

35. The device of claim 34, wherein the zero-bit-loading one or more upstream subcarriers comprises assigning zero information bits to each of the one or more upstream subcarriers by a series of SRA commands.

\* \* \* \* \*